G. T. BOHAN.
SAFETY FILLING DEVICE FOR TEA KETTLES.
APPLICATION FILED JAN. 14, 1909.
933,052.
Patented Sept. 7, 1909.
2 SHEETS—SHEET 2.
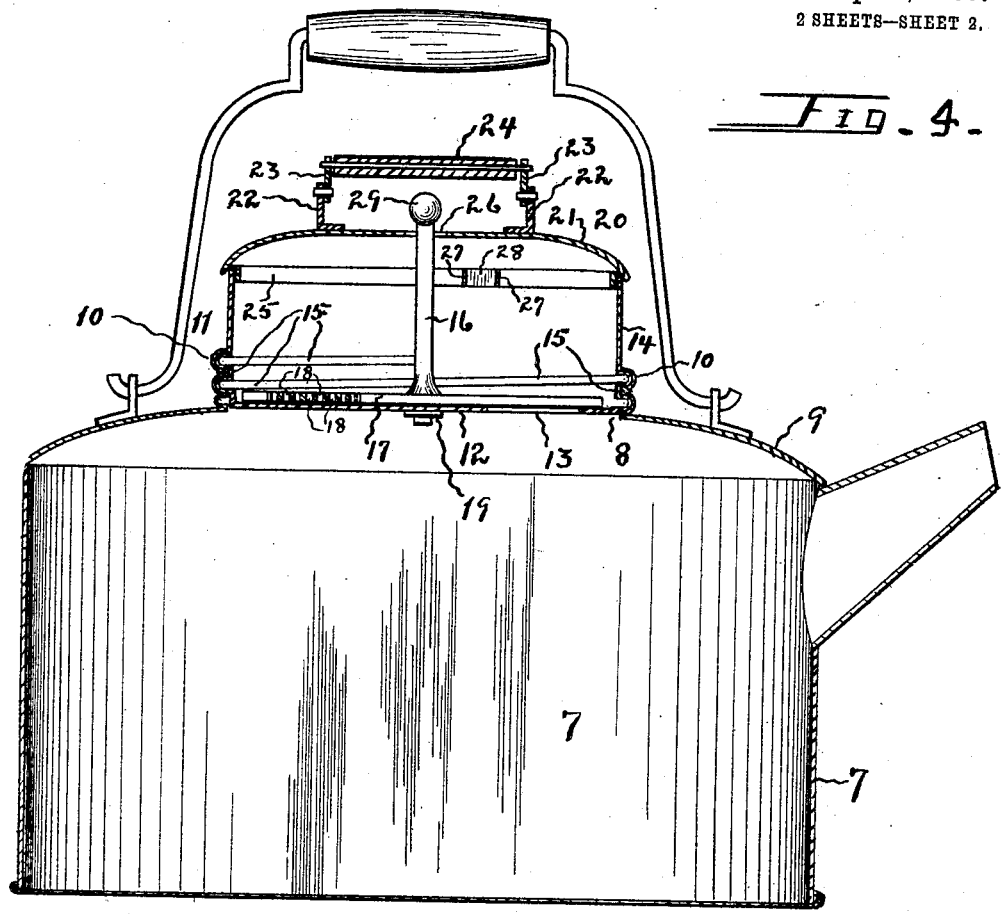
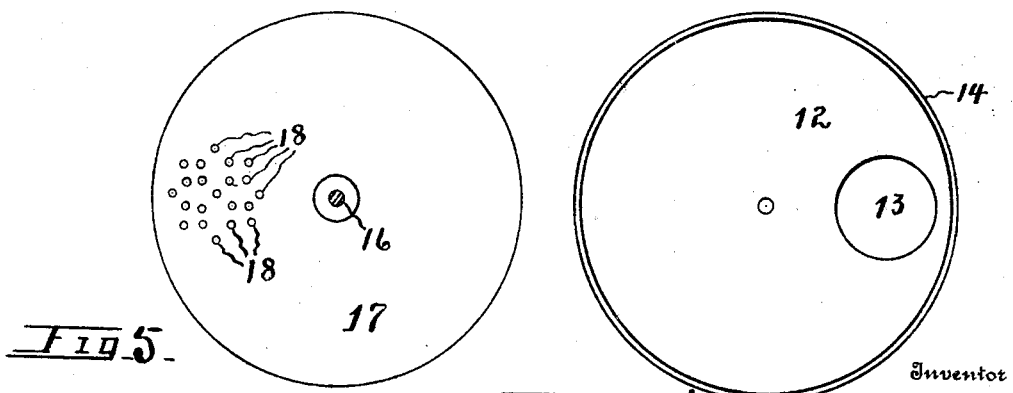

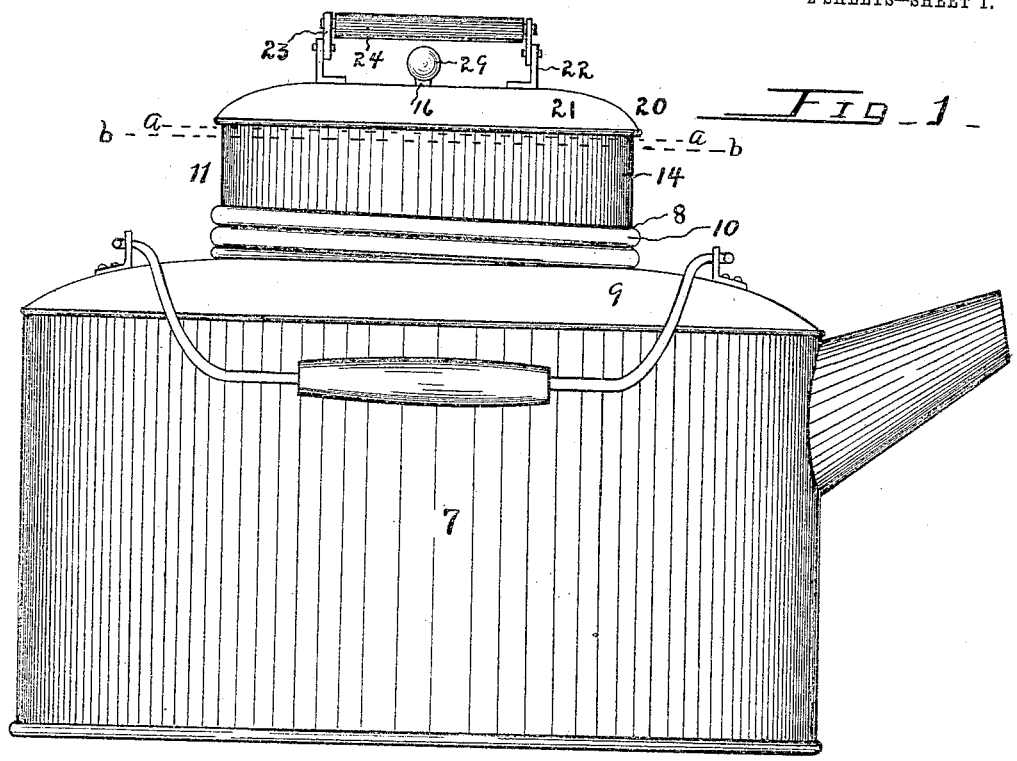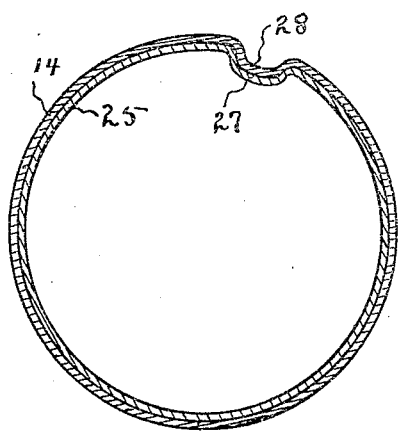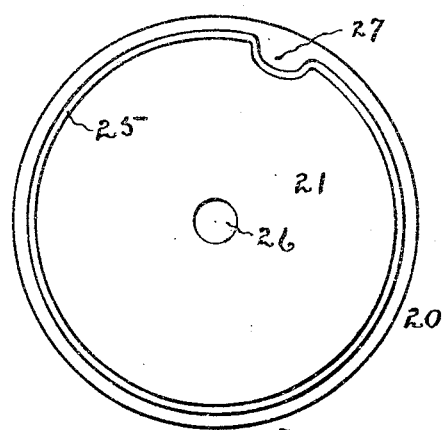

UNITED STATES PATENT OFFICE.

GUY T. BOHAN, OF MAZA, NORTH DAKOTA.

SAFETY FILLING DEVICE FOR TEA-KETTLES.

933,052.  Specification of Letters Patent.  Patented Sept. 7, 1909.

Application filed January 14, 1909. Serial No. 472,216.

*To all whom it may concern:*

Be it known that I, GUY T. BOHAN, a citizen of the United States, residing at Maza, in the county of Towner and State of North Dakota, have invented certain new and useful Improvements in Safety Filling Devices for Tea-Kettles, of which the following is a specification.

This invention relates to a safety filling device for tea kettles, and has for its object, broadly, the provision of means whereby steam may be prevented from escaping through the intake opening at the top of the kettle, these means not interfering with the operation of filling, and thereby preventing injury to the operator from the scalding effects of steam, while removing the lid or while filling the kettle.

The invention includes the employment of a secondary receptacle which may be removably secured upon the top of the kettle and which may be conveniently filled with cold water while the water in the kettle is boiling, whereby the latter may be filled without exposing the hand of the operator to the steam, such device to be reliable in operation and comprising few and simple parts so that it may be economical in manufacture.

With these and other objects in view the invention presents a novel combination and arrangement of parts as described herein, pointed out in the appended claim and as illustrated in the drawing, wherein,—

Figure 1 is a side view of a tea kettle provided with a safety filling device embodying my invention. Fig. 2 is a plan view showing the rim of the secondary or filling-receptacle, and the rim or flange of the lid, and lugs or recesses thereon, being a sectional view between lines *a a* and *b b* of Fig. 1. Fig. 3 is a plan view of the bottom of the lid. Fig. 4 is a sectional view showing a tea kettle with my newly invented safety filling device thereon. Fig. 5 is a plan view of the revoluble closure-plate, the spindle being in section. Fig. 6 is a plan view of the bottom of the secondary receptacle.

Referring now to the drawing for a more particular description of the invention, numeral 7 indicates the containing-wall of a tea kettle having an opening or intake 8 formed in its upper, transverse wall 9, said upper wall preferably having a spiral groove 10 formed at its upper, open terminal. I provide a secondary or filling-receptable 11 comprising a bottom 12 having an opening 13. This receptacle preferably has a circular side wall 14 having at its lower end the spiral ridge 15 adapted to register with groove 10 for securing receptacle 11 upon the kettle.

Opening 13 is located intermediate the middle and the outer edge of bottom 12. I provide the circular closure-plate 17 having a series of perforations 18 located near each other upon a part of its area. Plate 17 is disposed adjacent to and parallel with bottom 12 and is secured at its middle upon or near the bottom of the upright spindle 16, and the lower end of the spindle is pivotally mounted upon and at the middle of bottom 12, and preferably is secured by nut 19 immediately below said bottom 12. As thus described plate 17 is rotatable. That part of the area of plate 17 occupied by perforations 18 is at a radial distance from spindle 16 equal to the radial distance of opening 13 from the spindle, when the parts are assembled, and if the spindle is partly rotated it will cause perforations 18 of plate 17 to register with said opening 13, and if it be again partly rotated, it is apparent that the blank or unperforated part of plate 17 will be presented adjacent to opening 13, thereby causing, substantially, a closure of this opening.

I provide the lid 20, comprising the top or cover 21 having ears 22 within which are pivotally mounted the arms 23, and between arms 23 is mounted the handle 24. Cover 21 is provided with rim or flange 25 which may be seated within wall 14, and the cover is provided with a central opening 26. Flange 25 is provided with recess or slot 27, and wall 14 is provided with the projection or lug 28.

In operation, to fill the kettle, the parts being in the position shown in Fig. 4, lid 20 is raised upwardly, manually, by means of handle 24, the wall of recess 27 at this time, sliding upward upon lug 28; and as the lid is removed head 29 will traverse opening 26. It will be seen that receptacle 11 may, at this time, be filled, and injury to the hand of the operator from escaping steam is practically eliminated, since opening 13 is closed. A partial rotation of spindle 16 will cause the perforations to register with opening 13 and the water will pass within the kettle.

It will be seen that spindle 16 may be rotated while lid 20 is upon the filling-receptacle, since head 29, at this time, projects exteriorly of the lid. When about to fill the kettle, the operator, if steam has been generated, rotates head 29 so that a closure is made of opening 13.

By removing the threaded nut 19, plate 17 may be removed from receptacle 11, for purpose of conveniently cleaning the parts. To remove receptable 11 from the tea kettle proper, it is unscrewed, that is to say, wall 14 of receptacle 11 may be moved circularly to cause spiral ridge 15 to pass out of engagement with groove 10, the operator at this time grasping handle 24. The rim of lid 20 will not slide circularly upon wall 14, since lug 28 engages within recess or slot 27.

In the use of the herein described tea kettle with the safety device attachment thereon, receptable 11 is very rarely removed. A closure of opening 13 may be readily accomplished and lid 20 may be quickly removed for the purpose of filling the kettle with water, and this operation, by reason of the construction described, is not attended with the injurious results mentioned.

While I have explained the device with exactness, the scope of the invention is considered more broad than the description and I do not limit myself to specific details, except so far as limited by the claim.

What I claim as my invention and desire to secure by Letters Patent is,—

In a device of the character described, the combination with a kettle body having an opening in the top thereof, a threaded upstanding member surrounding said opening, a removable casing having threaded engagement therewith said casing having an open top and having an opening formed through its bottom, a rotatable plate having a series of perforations therein, said plate resting upon the bottom of the casing, a closure for said casing and an actuating stem secured to said rotatable plate and projecting through said closure.

In testimony whereof I have affixed my signature in presence of two witnesses.

GUY T. BOHAN.

Witnesses:
JOSEPH HANSON,
THOS. E. ENGELHORN.